July 6, 1948. A. N. SMITH 2,444,753
COOKING UTENSIL
Filed June 21, 1946
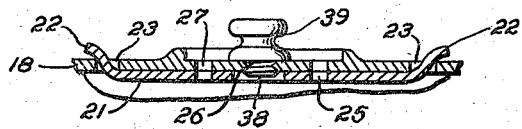
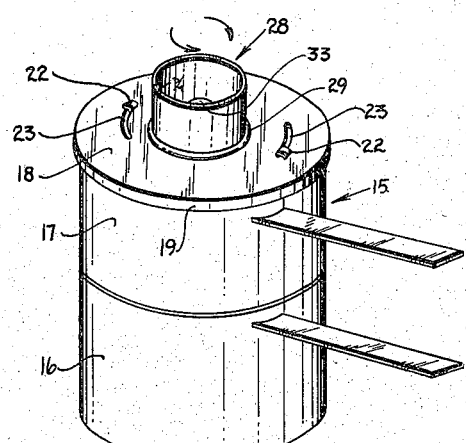
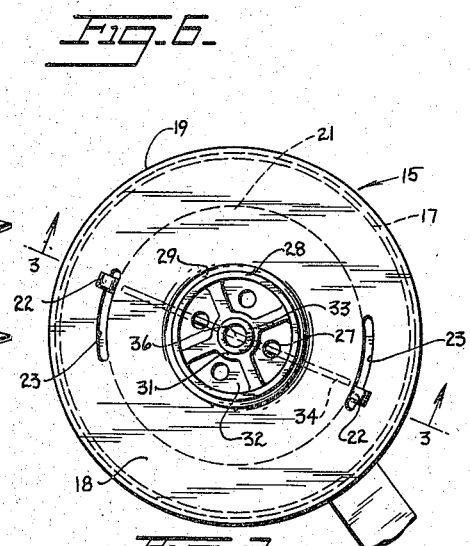
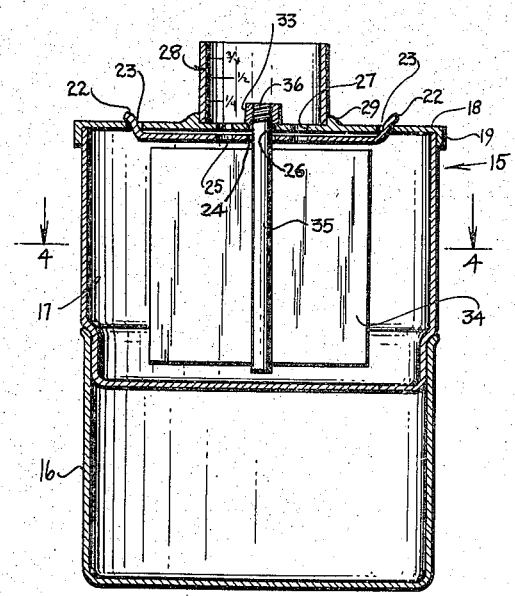
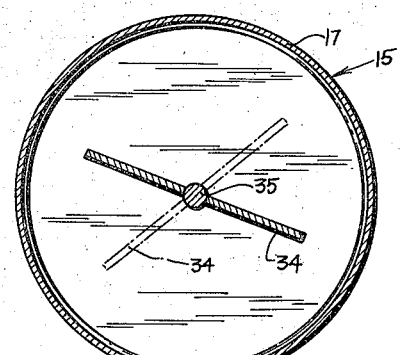
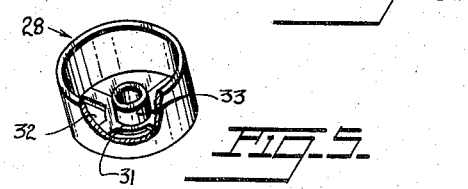
INVENTOR
ALEXANDER N. SMITH Patented July 6, 1948

2,444,753

UNITED STATES PATENT OFFICE 2,444,753

COOKING UTENSIL

Alexander N. Smith, Spring Valley, N. Y.

Application June 21, 1946, Serial No. 678,442

5 Claims. (Cl. 259—20)

This invention relates to cooking utensils and more particularly to the construction of double boilers wherein there will be provided with the boiler cover a measuring cup for measuring the material such as cereal or a fluid to be introduced into a liquid within the upper part of the boiler.

It is an object of the present invention to provide a cover for a double boiler having a measuring cup into which food or other material to be introduced into the upper compartment of the boiler can be measured and retained until it is desired that the same be introduced into the boiler.

It is another object of the invention to provide a combined measuring cup device and stirring blade whereby to keep the parts adapted for measuring and stirring the food in boilers to a minimum and which can be easily separated from one another to permit easy cleaning of the boiler parts.

It is another object of the invention to provide a combined measuring cup and stirring blade construction which will not only have its parts readily separated from one another but also wherein the combined parts can be removed, and the cover by applying a handle be converted into an ordinary cover for use with double boilers.

According to the invention the cover for the upper boiler part has a central threaded hole and a plurality of holes radially spaced from the central hole and nested or angularly spaced about the same. The top of the cover is adapted to support a measuring cup or a handle. The measuring cup has a bottom spider construction with openings therethrough for permitting the flow of cereal or the like when the measuring cup is oscillated about a vertical axis on the top of the cover.

The hub of the spider construction has a central threaded bore adapted to receive the upper end of a stirring blade shaft extending upwardly through the central opening in the top of the cover. As the measuring cup is oscillated the stirring blade is given a similar motion. Upon the bottom face of the cover and having handle portions extending through slots in the cover, is a valve plate having circumferentially spaced openings adapted to respectively register with openings in the cover when the valve plate has been adjusted to its open position.

If it is desired to make the cover so that it is relieved of the measuring cup and the stirring blade, the measuring cup is screwed off the stirring blade shaft and the parts severed from the opposite faces of the cover. Within the central threaded hole of the cover, there is secured an ordinary handle for the top of the cover. The valve plate is left on the cover so as to control the flow of vapor out of the upper part of the boiler.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of an assembled boiler having the measuring cup and the connected stirring blade.

Fig. 2 is an enlarged top plan view of the boiler looking upon the top of the cover.

Fig. 3 is a cross sectional view of the assembled boiler taken along the line 3—3 of Fig. 2.

Fig. 4 is a transverse cross sectional view taken through the upper part of the boiler as viewed along the line 4—4 of Fig. 3 looking in the direction of the arrows thereof and illustrating the blade in two positions.

Fig. 5 is a perspective view of the measuring cup with part of its wall broken away to show the bottom open spider construction.

Fig. 6 is a fragmentary vertical central sectional view of a modified form, showing the measuring cup omitted.

Referring now particularly to Figs. 1 to 7, 15 represents a double boiler having a lower part or compartment 16 adapted to contain the boiling water which serves to heat the liquid in an upper part or compartment 17 of the boiler adapted to fit into the top of the lower part 16. On the upper compartment there is a cover 18 having a downwardly turned peripheral flange 19 serving to center the cover upon the upper edge of the compartment 17.

Secured to the bottom face of the cover 18 is a valve plate 21 having upwardly extending handle portions 22 on diametrically opposite sides of the plate 21 adapted to extend through arcuate slots 23 in the cover 18 whereby the valve plate can be retained and adjusted about a central axis of the cover. This valve plate has a central hole 24 (Fig. 6), and four small holes 25 radially spaced from the central hole 24 and circumferentially spaced from one another. The valve plate is retained on the cover by the handle projections 22.

The cover itself has a central screw threaded opening 26 and circumferentially spaced smaller openings 27 following the same pattern as the openings 24 and 25 of the valve plate 21. The openings of the valve plate can be brought into registry with the openings of the cover when it is desired to permit the flow of cereal or other material contained in a measuring cup 28 resting on the top of the cover about the openings, or at times when it is desired to permit the flow of vapors from the interior of the upper compartment 17 to the atmosphere. The measuring cup 28 is retained on the top of the cover against lateral displacement by an upwardly extending ring-like formation 29. The bottom of the measuring cup 28 has a spider structure 31 with openings 32 therethrough and with an internally threaded hub 33.

Within the compartment 17 there is located a stirring blade 34 having an operating shaft 35 with a threaded upper end 36. This threaded upper end 36 projects upwardly from the compartment through the central opening 24 of the valve plate 21 and the threaded opening 26 of the cover aligned therewith for connection with the internally threaded hub 33 of the spider bottom 31. Thus a connection is made with the measuring cup 28 such that as the contents of the measuring cup are delivered to the compartment 17 by rotation of the measuring cup, the stirring blade 34 is operated so that the contents as they enter the compartment 17 will be automatically stirred into the fluid therewithin. After the measuring cup has been relieved of its contents and the same adequately stirred into the liquid of the upper compartment, the valve plate 21 may be swung into position so that its openings are out of registry with the openings of the cover and the cover openings thereby closed.

Referring now more particularly to Fig. 6, there is shown a converted construction where the cover is relieved of the measuring cup and the stirring blade. The stirring blade shaft 35 has been unscrewed from the measuring cup spider hub 33 and the measuring cup and the stirring blade severed from one another and from the opposite top and bottom faces of the cover.

The valve plate 21 is left in place on the cover. Since the central opening 26 is threaded it can receive and retain the downwardly extending threaded projection 38 of a cover handle 39 resting on and secured to the top of the cover 18. The valve plate 21 can then be closed so that its openings 25 are out of registry with the openings 27 of the cover and so that the cover will serve to fully close the top of the compartment 17. The arrangement can now be used as an ordinary double boiler.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A boiler construction having an open top, a cover adapted to fit the open top and having a plurality of holes therein, a measuring cup adapted to fit on the top of the cover and to be oscillated, said measuring cup having an open bottom construction, a stirring blade within the compartment and having an operating shaft, said shaft extending upwardly through one of the openings of the cover, and means for connecting the shaft with the measuring cup bottom whereby as the measuring cup is oscillated to urge the contents of the same through openings of the cover the stirring blade will be automatically oscillated to stir the contents into liquid within the compartment.

2. A boiler construction having an open top, a cover adapted to fit the open top and having a plurality of holes therein, a measuring cup adapted to fit on the top of the cover and to be oscillated, said measuring cup having an open bottom construction, a stirring blade within the compartment and having an operating shaft, said shaft extending upwardly through one of the openings of the cover, means for connecting the shaft with the measuring cup bottom whereby as the measuring cup is oscillated to urge the contents of the same through openings of the cover the stirring blade will be automatically oscillated to stir the contents into liquid within the compartment, and a valve plate having openings adapted to register with the openings in the cover at times when the contents of the measuring cup are being dispensed into the compartment and adapted to be closed at will.

3. A boiler construction having an open top, a cover adapted to fit the open top and having a plurality of holes therein, a measuring cup adapted to fit on the top of the cover and to be oscillated, said measuring cup having an open bottom construction, a stirring blade within the compartment and having an operating shaft, said shaft extending upwardly through one of the openings of the cover, means for connecting the shaft with the measuring cup bottom whereby as the measuring cup is oscillated to urge the contents of the same through openings of the cover the stirring blade will be automatically oscillated to stir the contents into liquid within the compartment, said measuring cup and stirring blade shaft being removably connected with one another so that the same can be relieved from the respective upper and bottom faces of the cover for cleaning purposes.

4. A double boiler having an upper compartment, a cover adapted to fit the upper compartment and having a central hole, a plurality of openings in the cover radially spaced from the central hole and circumferentially spaced from one another, a measuring cup supported on the top of the cover for oscillating movement, said measuring cup having a bottom spider structure through which the contents of the measuring cup can be dispensed and an internally threaded hub adapted to be aligned with the central hole of the cover, a stirring blade within said upper compartment and having a shaft with an upper threaded end adapted to extend upwardly through the central hole in the cover for connection wtih the measuring cup spider hub whereby as the cup is oscillated to dispense its contents the contents will be automatically stirred into liquid in the boiler compartment.

5. A double boiler having an upper compartment, a cover adapted to fit the upper compartment and having a central hole, a plurality of openings in the cover radially spaced from the central hole and circumferentially spaced from one another, a measuring cup supported on the top of the cover for oscillating movement, said measuring cup having a bottom spider structure through which the contents of the measuring cup can be dispensed and an internally threaded hub adapted to be aligned with the central hole of the cover, a stirring blade within said upper compartment and having a shaft with an upper threaded end adapted to extend upwardly through the central hole in the cover for connection with the measuring cup spider hub whereby as the cup is oscillated to dispense its contents the contents will be automatically stirred into liquid in the boiler compartment, a valve plate connected for angular adjustment with respect to the cover and cooperating with the bottom face thereof, said valve plate having openings corresponding to the openings of the cover so that the passage of the contents from the measuring cup through the cover openings can be controlled, said valve plate having a central opening and the stirring blade shaft extending through this opening for connection with the measuring cup spider hub.

ALEXANDER N. SMITH.

REFERENCES CITED

The following references are of record in the file of this patent:

UNITED STATES PATENTS

| Number | Name | Date |
| --- | --- | --- |
| 420,262 | Boemermann | Jan. 28, 1890 |
| 636,737 | Bagley | Nov. 7, 1899 |
| 756,327 | Carkeek | Apr. 5, 1904 |
| 907,766 | Foster | Dec. 29, 1908 |
| 1,523,644 | Herkel et al. | Jan. 20, 1925 |